US008871703B2

(12) United States Patent
Morschhaeuser et al.

(10) Patent No.: US 8,871,703 B2
(45) Date of Patent: *Oct. 28, 2014

(54) POLYESTER CONCENTRATES HAVING HIGH STABILITY IN SOLUTION AND HAVING A GREYING-INHIBITING EFFECT

(75) Inventors: Roman Morschhaeuser, Mainz (DE); Barbara Duecker, Mainz (DE); Frank-Peter Lang, Hattersheim (DE); Georg Borchers, Bad Nauheim (DE); Peter Naumann, Taunusstein (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 13/512,260

(22) PCT Filed: Nov. 24, 2010

(86) PCT No.: PCT/EP2010/007125
§ 371 (c)(1),
(2), (4) Date: Sep. 19, 2012

(87) PCT Pub. No.: WO2011/063945
PCT Pub. Date: Jun. 3, 2011

(65) Prior Publication Data
US 2013/0200290 A1 Aug. 8, 2013

(30) Foreign Application Priority Data
Nov. 27, 2009 (DE) .......................... 10 2009 056 126

(51) Int. Cl.
*B08B 3/04* (2006.01)
*C08G 63/672* (2006.01)
*C08G 63/688* (2006.01)
*C11D 3/00* (2006.01)
*C11D 3/37* (2006.01)

(52) U.S. Cl.
CPC .......... *C11D 3/0036* (2013.01); *C08G 63/6886* (2013.01); *C11D 3/3715* (2013.01); *C08G 63/672* (2013.01)
USPC ........... 510/475; 510/476; 510/477; 510/492; 510/505; 8/137

(58) Field of Classification Search
CPC .... C11D 3/3715; C11D 3/3707; C11D 3/378; B08B 3/04; C08G 63/672; C08G 63/688
USPC ............... 510/475, 476, 477, 492, 505; 8/137
See application file for complete search history.

(56) References Cited

U.S. PATENT DOCUMENTS

| | | |
|---|---|---|
| 3,128,287 A | 4/1964 | Berg |
| 3,159,581 A | 12/1964 | Diehl |
| 3,213,030 A | 10/1965 | Diehl |
| 3,332,880 A | 7/1967 | Kessler et al. |
| 3,400,148 A | 9/1968 | Quimby |
| 3,422,021 A | 1/1969 | Roy |
| 3,422,137 A | 1/1969 | Quimby |
| 3,635,830 A | 1/1972 | Lamberti et al. |
| 3,985,669 A | 10/1976 | Krummel et al. |
| 4,374,035 A | 2/1983 | Bossu |
| 4,427,557 A | 1/1984 | Stockburger |
| 4,566,984 A | 1/1986 | Bush |
| 4,605,509 A | 8/1986 | Corkill et al. |
| 4,663,071 A | 5/1987 | Bush et al. |
| 4,702,857 A | 10/1987 | Gosselink |
| 4,721,580 A | 1/1988 | Gosselink |
| 4,968,451 A | 11/1990 | Scheibel et al. |
| 5,142,020 A | 8/1992 | Kud et al. |
| 5,415,807 A | 5/1995 | Gosselink et al. |
| 5,599,782 A | 2/1997 | Pan et al. |

(Continued)

FOREIGN PATENT DOCUMENTS

DE 691 15 915 T2 8/1996
DE 197 35 715 A1 2/1999

(Continued)

OTHER PUBLICATIONS

J 51136922 A2 (HCAPLUS-Abstract: AN 1977:107920).
JP 56026006 A2 (HCAPLUS-Abstract: AN 1981:426542).
The Journal of the American Oil Chemists Society 52 (1975), pp. 323 329.
German Patent Office Action for 10 2005 061 058.7-44, Aug. 30, 2006.
International Search Report for PCT/EP2006/011756 mail dated Feb. 27, 2007.

(Continued)

*Primary Examiner* — Brian P Mruk
(74) *Attorney, Agent, or Firm* — Tod A. Waldrop

(57) ABSTRACT

The invention relates to an aqueous polyester concentrate having a proportion by weight of polyesters of 12 to 60%, wherein the polyesters are obtainable by means of polymerization of the components selected from a) one or more sulfo group-free aromatic dicarboxylic acids and/or salts thereof and/or anhydrides thereof and/or esters thereof, b) optionally one or more sulfo group-containing dicarboxylic acids, salts thereof and/or anhydrides thereof and/or esters thereof, c) 1,2-propylene glycol, d) ethylene glycol, e) one or more compounds of the formula (1) $R^1O(CHR^2CHR^3O)_nH$ (1), where $R^1$ is a linear or branched, saturated or unsaturated alkyl group having from 1 to 22 C atoms, $R^2$ and $R^3$, independently of one another, are hydrogen or an alkyl group having from 1 to 4 carbon atoms, and n is an integer of from 1 to 50, f) optionally one or more compounds of the formula (2) $H-(OCH_2CH_2)_m-SO_3X$ (2), where m is an integer of from 1 to 10 and X is hydrogen or an alkali metal ion, and g) optionally one or more cross-linking polyfunctional compounds, provided that at least one of the components b) or f) is present, and provided further that the molar ratio of the components c) 1,2-propylene glycol to d) ethylene glycol is greater than or equal to 1.60.

10 Claims, No Drawings

(56) References Cited

U.S. PATENT DOCUMENTS

| | | |
|---|---|---|
| 5,691,298 A | 11/1997 | Gosselink et al. |
| 6,537,961 B1 | 3/2003 | Koch |
| 2009/0036641 A1* | 2/2009 | Lang et al. .................... 528/295 |
| 2012/0309665 A1 | 12/2012 | Morschhaeuser et al. |

FOREIGN PATENT DOCUMENTS

| | | |
|---|---|---|
| EP | 0 384 070 A2 | 8/1990 |
| EP | 0 442 101 B1 | 8/1991 |
| EP | 0 854 136 B1 | 7/1998 |
| EP | 1966273 | 3/2009 |
| GB | 1082179 | 9/1967 |
| JP | 51-136922 | 11/1976 |
| JP | 56-026006 | 3/1981 |
| WO | WO 91/17243 A1 | 11/1991 |
| WO | WO 95/02030 A1 | 1/1995 |
| WO | WO 03/012024 A1 | 2/2003 |
| WO | WO 2007/079850 * | 7/2007 ........... C08G 63/183 |
| WO | WO 2008/110318 | 9/2008 |

OTHER PUBLICATIONS

International Search Report for PCT/EP2010/007125 mail dated Feb. 21, 2011.
International Preliminary Report on Patentability for PCT/EP2010/007125 mail dated Jul. 12, 2012.
International Search Report for PCT/EP2010/007124 mail dated Feb. 21, 2011.
International Preliminary Report on Patentability for PCT/EP2010/007124 mail dated Jun. 14, 2012.
Abstract of WO2008110318, Sep. 18, 2008.

* cited by examiner

POLYESTER CONCENTRATES HAVING HIGH STABILITY IN SOLUTION AND HAVING A GREYING-INHIBITING EFFECT

The invention relates to aqueous polyester concentrates (soil release polymers, SRPs) which feature good solution stability and, in the wash liquor, exhibit a strong graying inhibition effect on textiles.

The use of polyesters in washing compositions to improve soil detachment from textiles, to reduce restaining, to protect the fibers in the event of mechanical stress and to finish the fabric with an anticrease effect is known. A multitude of polyester types and the use thereof in washing and cleaning compositions are described in the patent literature.

U.S. Pat. No. 4,702,857 claims polyesters formed from ethylene glycol, 1,2-propylene glycol or mixtures thereof with high ethylene glycol contents, polyethylene glycol which has at least 10 glycol units and is capped at one end with a short-chain alkyl group, especially a methyl group, a dicarboxylic acid or ester and optionally alkali metal salts of sulfonated aromatic dicarboxylic acids.

U.S. Pat. No. 4,427,557 describes polyesters with molecular weights in the range from 2000 to 10 000 g/mol, prepared from the monomers ethylene glycol, polyethylene glycol with molecular weights of 200 to 1000 g/mol, aromatic dicarboxylic acids and alkali metal salts of sulfonated aromatic dicarboxylic acids and optionally from small amounts of aliphatic dicarboxylic acids, for example glutaric acid, adipic acid, succinic acid, glutaric acid, pimelic acid, suberic acid, azelaic acid, sebacic acid and 1,4-cyclohexanedicarboxylic acid, and emphasis is given to the anticrease effect and soil release effect thereof on polyester fabric or on polyester-cotton blend fabric.

U.S. Pat. No. 4,721,580 discloses polyesters with terephthalate units and sulfo-containing end groups, more particularly sulfoethoxylated end groups $MO_3S(CH_2CH_2O)_n$—H, and emphasizes the use thereof in washing compositions and fabric softeners.

U.S. Pat. No. 4,968,451 describes polyesters with sulfo-containing end groups, obtained by copolymerization of (meth)allyl alcohol, alkylene oxide, aryldicarboxylic acid and $C_2$-$C_4$-glycol, and subsequent sulfonation.

U.S. Pat. No. 5,691,298 claims polyesters as SRPs with a branched backbone composed of di- or polyhydroxysulfonate, terephthalate and 1,2-oxyalkyleneoxy units with nonionic or anionic end groups.

U.S. Pat. No. 5,415,807 states that soil release polymers with sulfonated polyethoxy/propoxy end groups tend to crystallize, which results in a reduction in the soil release effects.

EP 1 966 273 A1 and WO 2008/110318 A2 disclose SRPs formed from terephthalic acid, sulfoisophthalic acid and (poly)alkylene glycols which have a molar propylene glycol/ethylene glycol ratio of less than 1.7.

In view of changing customer behavior, the proportion of liquid washing products in the overall washing products market is increasing globally. However, the change in the administration form is also associated with some unwanted side effects, the reason for which lies in the physical structure of liquid washing compositions. The zeolites, which are used only in powders, reduce the water hardness of the wash liquor in an effective manner and hence prevent the formation of lime soap, which precipitates as a gray haze on fabrics and, especially in the case of white fabrics, contributes to unwanted graying of the textiles. The physiochemical nature of the zeolites (solids), however, prevents the use of this washing composition component in liquid formulations. The effect of this disadvantage is that, even now, the problem of graying of textiles is yet to be solved satisfactorily for liquid washing compositions. This disadvantage with respect to washing powders can be alleviated by addition of cobuilders based on polyacrylic acid and cellulose-based graying inhibitors, but only if further formulation disadvantages are accepted, such as turbidity, high viscosity or undesirable rheological profile. Since, aside from zeolites, it has also not been possible to date to use any bleach systems in liquid formulations in one-chamber systems, the effect of this to date has always been that powders are classified as superior to the liquid washing compositions in commonly acknowledged test series.

In order to be able to satisfy customer wishes, it is necessary to develop effective graying inhibitors for liquid washing compositions, which firstly provide the desired performance in the wash liquor and secondly do not adversely affect the rheology and the appearance of the respective formulation. In the ideal case, the production of clear liquid washing compositions is to be enabled.

It is known from the literature that terephthalate-based soil release polyesters are capable of effectively preventing the graying of textiles. It has also been found that charged structures, for example anionic soil release polyesters, are very much more effective overall than nonionic types dosed in a corresponding amount. In spite of their superior graying inhibition profile, anionic polyesters have to date been used only in powder formulations. The reason for this is the difficulty of bringing polyesters based on sulfo groups into aqueous solution. Firstly, the dissolution characteristics of the polymers are very highly temperature-dependent. Many anionic polyesters dissolve significantly in water only from temperatures above 25° C. Secondly, crystallization phenomena prevent dissolution at lower temperatures. The effect of these crystallization characteristics in aqueous solution too is that the polymer chains present in solution crystallize subsequently to form small and ultrasmall crystals which coalesce to form a network and unfavorably influence the rheology. Such solutions or dispersions can no longer be incorporated into liquid washing compositions with viable solids contents (>10% by weight).

It was accordingly an aim of the invention to develop polyester structures based on sulfo-containing monomers, which firstly exhibit very good graying inhibition performance when used in liquid washing compositions and secondly exhibit only a minimal crystallization tendency and are storage-stable in aqueous solution. These polymer solutions, referred to as concentrate (active content >10% by weight), shall be suitable for use in liquid washing composition formulations and at the same time be of maximum clarity and minimum viscosity.

It has been found that, surprisingly, the object of the invention is achieved by sulfo-containing polyesters below having a particular propylene glycol/ethylene glycol (PG/EG) ratio.

The invention provides aqueous polyester concentrates having a proportion by weight of polyester of 12 to 60%, preferably 15 to 60%, more preferably 20 to 50% and especially 30 to 45%, the polyesters being obtainable by polymerizing the components selected from a) one or more sulfo-free aromatic dicarboxylic acids and/or salts thereof and/or anhydrides thereof and/or esters thereof, b) optionally one or more sulfo-containing dicarboxylic acids, salts thereof and/or anhydrides thereof and/or esters thereof, c) 1,2-propylene glycol,
d) ethylene glycol,
e) one or more compounds of the formula (1)

$$R^1O(CHR^2CHR^3O)_nH \tag{1}$$

where
$R^1$ is a linear or branched, saturated or unsaturated alkyl group having 1 to 22 carbon atoms, preferably $C_1$-$C_4$-alkyl, especially methyl,
$R^2$ and $R^3$ are each independently hydrogen or an alkyl group having 1 to 4 carbon atoms, preferably hydrogen and/or methyl, and
n is a number from 1 to 50, preferably 2 to 10,
f) optionally one or more compounds of the formula (2)

$$H—(OCH_2CH_2)_m—SO_3X \tag{2}$$

where
m is a number from 1 to 10 and
X is hydrogen or an alkali metal ion, and
g) optionally one or more crosslinking polyfunctional compounds,
with the proviso that at least one of components b) or f) is present, and with the further proviso that the molar ratio of components c) 1,2-propylene glycol to d) ethylene glycol is greater than or equal to 1.60.

Appropriately, the molar ratio of 1,2-propylene glycol (PG):ethylene glycol (EG) is 1.60 to 20.0, preferably 1.7 to 10.0, especially 2.0 to 8.0, more preferably 2.5 to 7.0 and most preferably 2.7 to 5.0.

Preference is given to polyesters obtainable by polymerizing components a) to g) in the following molar ratios, based on 1 mol of component a):
0 to 4 mol, preferably 0.1 to 2 mol, especially 0.2 to 1.5 mol and most preferably 0.3 to 1.1 mol of component b),
0.1 to 4 mol, preferably 0.5 to 3 mol, especially 0.6 to 2.5 mol and most preferably 0.8 to 1.5 mol of diol components c)+d),
0.1 to 4 mol, preferably 0.2 to 2 mol, especially 0.3 to 1.0 mol and most preferably 0.3 to 0.8 mol of component e),
0 to 4 mol, preferably 0.1 to 2 mol, especially 0.2 to 1.0 mol and most preferably 0.3 to 0.8 mol of component f),
0 to 0.2 mol, preferably 0 to 0.1 mol and especially 0 mol of component g), with the aforementioned provisos.

Preference is further given to polyesters obtainable by polymerizing components a) to g) in the following molar ratios, based on 1 mol of component a):
0.1 to 2 mol, especially 0.2 to 1.5 mol and most preferably 0.3 to 1.1 mol of component b),
0.5 to 4 mol, especially 0.6 to 3 mol and most preferably 0.8 to 2.5 mol of diol components c)+d),
0.1 to 4 mol, preferably 0.2 to 2 mol, especially 0.3 to 1.0 mol and most preferably 0.3 to 0.8 mol of component e),
0 mol of component f),
0 mol of component g),
with the aforementioned provisos.

Preferred compounds of component a) are terephthalic acid, especially $C_1$-$C_4$-alkyl esters of terephthalic acid, for example dimethyl terephthalate, and isophthalic acid and $C_1$-$C_4$-alkyl esters of isophthalic acid.

Preferred compounds of component b) are 5-sulfoisophthalic acid, especially di($C_1$-$C_4$)alkyl 5-sulfoisophthalates and the alkali metal salts thereof, for example alkali metal salts of 5-sulfoisophthalic acid and dimethyl 5-sulfoisophthalate sodium salt or lithium salt.

Preferred compounds of component e) are singularly endcapped polyalkylene glycols (end stops), preferably poly[ethylene glycol-co-propylene glycol]monomethyl ethers having mean molecular weights of approx. 200 to 2000 g/mol, more preferably polyethylene glycol monomethyl ethers of the formula (1a)

$$CH_3—O—(C_2H_4O)_n—H \tag{1a}$$

where n=2-10, preferably where n=3-5, especially where n=4.

Preferred compounds of component f) are those of the formula (2a)

$$H—(OCH_2CH_2)_m—SO_3X \tag{2a}$$

where
m is a number from 1 to 4, more preferably 1 or 2, and
X is hydrogen, sodium or potassium.

Preferred compounds of component g) are crosslinking polyfunctional compounds having 3 to 6 functional groups capable of an esterification reaction, for example acid, alcohol, ester, anhydride or epoxy groups. Different functionalities are also possible in one molecule. Preferred examples here include citric acid, malic acid, tartaric acid and gallic acid, more preferably 2,2-dihydroxymethylpropionic acid.

It is additionally possible to use polyhydric alcohols such as pentaerythritol, glycerol, sorbitol and trimethylolpropane.

Additionally preferred are polybasic aliphatic and aromatic carboxylic acids such as benzene-1,2,3-tricarboxylic acid (hemimellitic acid), benzene-1,2,4-tricarboxylic acid (trimellitic acid), more preferably benzene-1,3,5-tricarboxylic acid (trimesic acid).

The proportion by weight of component g), based on the total mass of the polyesters, is preferably 0 to 10% by weight, more preferably 0 to 5% by weight and especially preferably 0 to 3% by weight, most preferably 0% by weight.

The inventive polyesters generally have number-average molecular weights in the range from 700 to 50 000 g/mol, preferably from 800 to 25 000 g/mol, especially 1000 to 15 000 g/mol and more preferably 1200 to 12 000 g/mol.

The number-average molecular weight is determined by means of size exclusion chromatography in aqueous solution using calibration with the aid of narrow-distribution polyacrylic acid Na salt standards. All molecular weight figures in this document are based on the number-average molecular weight.

Moreover, the polyesters used in accordance with the invention may, in addition to the above-described components a) to g), comprise structural elements of an aliphatic dicarboxylic acid, preferably 1,4-cyclohexanedicarboxylic acid.

The proportion by weight of the aliphatic dicarboxylic acid used may be 1 to 15%, preferably 3 to 10% and more preferably 5 to 8%, based on the total amount of the monomers used.

The polyesters used in accordance with the invention are synthesized by processes known per se, by polycondensation of components a) to g). Appropriately, the abovementioned components are heated with addition of a catalyst, initially at standard pressure, to temperatures of 160 to approx. 220° C. using an inert atmosphere, preferably in the presence of a salt of a $C_1$-$C_3$-alkylcarboxylic acid, especially a dehydrated or partially hydrated sodium acetate $CH_3COONa\times(H_2O)_x$ where $_x$ is a number in the range from 0 to 2.9, and where this salt is used in weights of 0.5% to 30%, preferably of 1% to 15%, more preferably of 3% to 8%, based on the total amount of the monomers used and the salt of the carboxylic acid. Then the required molecular weights are built up by distilling off overstoichiometric amounts of the glycols used under reduced pressure at temperatures of 160 to approx. 240° C. Suitable transesterification and condensation catalysts for the reaction are those known from the prior art, for example titanium tetraisopropoxide, dibutyltin oxide, alkali metal or alkaline earth metal alkoxides or antimony trioxide/calcium acetate.

In a preferred process for preparing the inventive polyesters, the condensation of the components is preformed in a one-pot process, with addition of the transesterification and condensation catalysts prior to heating.

The inventive polyesters have very good water solubility, do not exhibit any tendency to hydrolysis and form stable solutions which, even under severe external conditions (storage at 45° C.), have only an insignificant rise in solution viscosity, if any.

Furthermore, the inventive polyesters exhibit excellent dispersion capacity and hence counteract the graying of the textiles. The performance with regard to enhancement of the primary washing capacity, soil release activity and hydrophilization is comparable to that of solid anionic types.

The inventive polyester concentrate solutions are produced by dissolving the appropriate amount of polyester, for example, in water or in a combination of water with water-miscible solvents, such as propylene glycol, ethanol, isopropanol, t-butanol, ethylene glycol, glycol monomethyl ether, glycol dimethyl ether, diethylene glycol, triethylene glycol, polyethylene glycols (mass >120 g/mol). The polyester is introduced directly or in portions into the initial charge of water for dissolution at temperatures of 10 to 70° C., preferably 30 to 60° C. and more preferably 40 to 50° C., and dissolved completely by stirring.

To improve the solubility of the polyesters, it is also possible to add low molecular weight dispersants (hydrotropes) before or during the dissolution operation. Preference is given here to using alkylbenzenesulfonates, for example sodium cumenesulfonate, sodium xylenesulfonate or sodium toluenesulfonate. It has been found to be advisable to use these hydrotropes in an amount of 0.1 to 30% by weight, preferably 1 to 15% by weight, based on the total weight of the concentrate.

The polyester concentrates are stable over several months in the case of storage at 20 to 45° C. The viscosities of the inventive concentrates vary in the range from 15 to 15 000 mPas, preferably 100 to 8000 mPas and more preferably in the range from 500 to 5000 mPas.

The viscosities are measured by means of a Brookfield viscosimeter at 20 spindle rotations per minute at 25° C. The spindle used is adjusted according to the viscosity range. The inventive concentrates are virtually colorless to pale yellowish and very substantially transparent to opaque and solids-free.

The inventive polyester concentrates impart very good soil-detaching properties to the textile fibers, they substantially promote the soil detachment capacity of the other washing composition constituents with respect to oily, greasy or pigment stains, and prevent the deposition of particles from the wash liquor (especially lime soaps and soil pigments) onto the textile (graying).

The invention further provides for the use of the inventive polyester concentrates in washing and cleaning compositions, in aftertreatment compositions for the laundry, more particularly in a fabric softener, textile care compositions and textile finishing compositions.

The washing and cleaning composition formulations in which the inventive polyesters can be used are in the form of pastes, gels or liquids. Particular preference is given to liquid washing compositions.

Examples thereof are heavy duty washing compositions, light duty washing compositions, color washing compositions, wool washing compositions, washing compositions for drapes, modular washing compositions.

The inventive polyester concentrates are surprisingly also notable for excellent runoff performance, especially in the washing of plastic, ceramic and glass, and metal surfaces. In the cleaning of hard surfaces, the tendency to form lime deposits and the restaining of the treated surface are reduced, the adhesion of oil and soil is made more difficult and the renewed cleaning of the surfaces is made easier.

The inventive polyester concentrates can thus also be incorporated into domestic cleaning compositions, for example all-purpose cleaners, dishwasher detergents, rinse aids, carpet cleaning and impregnating compositions, cleaning and care compositions for floors and other hard surfaces, for example made from plastic, ceramic, glass, stone, metal, or surfaces coated with nanoparticles.

Examples of industrial cleaning compositions are plastic cleaning and care compositions, for instance for housings and automotive fittings, and cleaning and care compositions for painted surfaces, for instance car bodies.

According to the envisioned use thereof, the composition of the formulations should be adapted to the nature of the textiles to be treated or washed, or of the surfaces to be cleaned.

The washing and cleaning composition formulations may comprise standard ingredients, such as surfactants, emulsifiers, builders, bleach catalysts and activators, sequestrants, graying inhibitors, dye transfer inhibitors, dye fixatives, enzymes, optical brighteners, softening components. In addition, formulations or parts of the formulation can be selectively colored and/or perfumed by dyes and/or fragrances.

EXAMPLES

Polyester 1

A 1 l four-neck flask with precision glass stirrer, internal thermometer, gas inlet tube and distillation apparatus is initially charged with 203.6 g (2.68 mol) of 1,2-propanediol, 66.4 g (1.07 mol) of ethylene glycol, 72.9 g (0.35 mol) of tetraethylene glycol methyl ether, 291.3 g (1.50 mol) of dimethyl terephthalate and 148.1 g (0.5 mol) of dimethyl 5-sulfoisophthalate Na salt, and the reaction mixture is inertized by introducing $N_2$. Subsequently, 0.5 g of titanium tetraisopropoxide and 0.3 g of sodium acetate are added to the reaction mixture in an opposing gas flow. The mixture is heated to approx. 160° C. for approx. 15 to 20 minutes. The transesterification commences at this temperature; the methanol formed is distilled off.

During the distillation, the temperature is increased to 210° C. within 3 h. This is followed by cooling to 195° C. and reduction of the pressure to 10 mbar within 1 h. During the three-hour vacuum distillation, the condensation is completed by distilling off the excess amount of alcohol. The vacuum is reduced to 5 mbar for 5 minutes, followed by venting with $N_2$ and discharge of the melt onto metal sheets.

Polyester 2

A 1 l four-neck flask with precision glass stirrer, internal thermometer, gas inlet tube and distillation apparatus is initially charged with 210.6 g (2.77 mol) of 1,2-propanediol, 60.5 g (0.98 mol) of ethylene glycol, 72.9 g (0.35 mol) of tetraethylene glycol methyl ether, 291.3 g (1.50 mol) of dimethyl terephthalate and 148.1 g (0.5 mol) of dimethyl 5-sulfoisophthalate Na salt, and the reaction mixture is inertized by introducing $N_2$. Subsequently, 0.5 g of titanium tetraisopropoxide and 0.3 g of sodium acetate are added to the reaction mixture in an opposing gas flow. The mixture is heated to approx. 160° C. for approx. 15 to 20 minutes. The further procedure is as described in "Polyester 1".

Polyester 3

A 1 l four-neck flask with precision glass stirrer, internal thermometer, gas inlet tube and distillation apparatus is initially charged with 182.6 g (2.40 mol) of 1,2-propanediol, 84.5 g (1.36 mol) of ethylene glycol, 72.9 g (0.35 mol) of tetraethylene glycol methyl ether, 291.3 g (1.50 mol) of dimethyl terephthalate and 148.1 g (0.50 mol) of dimethyl 5-sulfoisophthalate Na salt, and the reaction mixture is inertized by introducing $N_2$. Subsequently, 0.5 g of titanium tetraisopropoxide and 0.3 g of sodium acetate are added to the reaction mixture in an opposing gas flow. The mixture is heated to approx. 160° C. for approx. 15 to 20 minutes. The further procedure is as described in "Polyester 1".

Polyester 16

A 1 l four-neck flask with precision glass stirrer, internal thermometer, gas inlet tube and distillation apparatus is initially charged with 136.8 g (1.8 mol) of 1,2-propanediol, 6.2 g (0.1 mol) of ethylene glycol, 109 g (0.56 mol) of dimethyl terephthalate, 56.3 g (0.19 mol) of dimethyl 5-sulfoisophthalate Na salt and 487 g (0.65 mol) of methyl polyethylene glycol MW 750, and the reaction mixture is inertized by introducing $N_2$. Subsequently, 0.26 g of titanium tetraisopropoxide and 0.15 g of sodium acetate are added to the reaction mixture in an opposing gas flow. The mixture is heated to approx. 160° C. for approx. 15 to 20 minutes. The further procedure is as described in "Polyester 1".

Polyester 4C

Comparative Example

A 1 l four-neck flask with precision glass stirrer, internal thermometer, gas inlet tube and distillation apparatus is initially charged with 233.0 g (3.75 mol) of ethylene glycol, 72.9 g (0.35 mol) of tetraethylene glycol methyl ether, 291.3 g (1.50 mol) of dimethyl terephthalate and 148.1 g (0.50 mol) of dimethyl 5-sulfoisophthalate Na salt, and the reaction mixture is inertized by introduction of $N_2$. Subsequently, 0.5 g of titanium tetraisopropoxide and 0.3 g of sodium acetate are added to the reaction mixture in an opposing gas flow. The mixture is heated to approx. 160° C. for approx. 15 to 20 minutes. The further procedure is as described in "Polyester 1".

The concentrates are produced by allowing the polymerization melt to cool, grinding it to particle sizes of 0.1 to 3 mm, adding the appropriate amount of water and stirring it in with an anchor stirrer until complete dissolution of the solid at 30 to 50° C. for 2 to 3 h.

In this way, polyesters 1 to 15 are each used to produce 40% by weight concentrates, and polyester 16 a 60% by weight concentrate.

TABLE 1

Solubility characteristics: 40% by weight aqueous concentrates at 22° C.; viscosity values, determined immediately after the synthesis and after 28 days

| Polyester | Viscosity at 22° C. [mPas] on day 1 | Viscosity at 22° C. [mPas] on day 28 |
|---|---|---|
| 1 | 500 | 650, clear |
| 2 | 450 | 650, clear to opaque |
| 3 | 800 | lightly pasty after 17 days |
| 4C | firm | — |

Viscosity measurement, Brookfield spinel 2, 20 revolutions, 22° C.

The polyesters reported in table 2 are prepared analogously to example 1, and the viscosity is measured as described above. Examples 5C to 8C are comparative examples.

TABLE 2

| Polymer | DMT [mol] | 5-SIM [mol] | TetGME [mol] | EG [mol] | PG [mol] | Appearance, viscosity [mPas], day 1 | Appearance, viscosity [mPas], day x |
|---|---|---|---|---|---|---|---|
| 5C | 3 | 1 | 1 | 1 | 1.05 | Cloudy, 30 000 | Day 3, firm |
| 6C | 3 | 1 | 1 | 1 | 1.16 | Cloudy, 35 000 | Day 3, firm |
| 7C | 3 | 1 | 1 | 1 | 1.28 | Cloudy, 20 000 | Day 10, pasty |
| 8C | 3 | 1 | 1 | 1 | 1.42 | Cloudy, 1000 | Day 17, pasty |
| 9 | 3 | 1 | 1 | 1 | 1.61 | Slightly cloudy, 1000 | Day 28, slightly pasty |
| 10 | 3 | 1 | 1 | 1 | 1.97 | Clear, 200 | Day 28, slightly cloudy, liquid, 8000 |
| 11 | 3 | 1 | 1 | 1 | 2.22 | Clear, 190 | Day 28, slightly cloudy, liquid, 5200 |
| 12 | 3 | 1 | 1 | 1 | 2.50 | Clear, 340 | Day 28, clear to opaque, liquid, 5000 |
| 13 | 3 | 1 | 1 | 1 | 2.84 | Clear, 190 | Day 28, clear, liquid, 4500 |
| 14 | 3 | 1 | 1 | 1 | 5.36 | Slightly cloudy, 350 | Day 28, opaque, liquid, 6000 |
| 15 | 3 | 1 | 1 | 1 | 8.51 | Cloudy, 580 | Day 28, slightly cloudy, liquid, 7500 |

DMT = dimethyl terephthalate
5-SIM = dimethyl 5-sulfoisophthalate Na salt
TetGME = tetraethylene glycol methyl ether
EG = ethylene glycol
PG = 1,2-propylene glycol Graying inhibition on polyester textile fibers (Testex PES 730): The polymers are added to the respective wash liquors in a concentration of 60 ppm (active ingredient), based on the test washing composition formulation (O). The wash liquors contain 6 g/l of formulation "O". 100 mg of an olive oil/gas black mixture are added to the wash liquor and dispersed in the wash liquor with stirring for 5 min. Subsequently, white polyester fabric Testex PES 730 (Testfabrics Inc., USA) is washed in the wash liquor thus conditioned at 20° C. for 20 minutes, at a water hardness of 15° dH H20/Ca:Mg=3:2.

After rinsing with fresh water 4 times, the test fabrics are first dried and then the whiteness thereof is determined with an Elrepho spectrophotometer and the reflectance is measured against an untreated Testex PES 730 standard test fabric. Reflectance [%, 457 nm]/400 nm edge filter.

The reflectance refers to the whiteness of the used test fabric after washing compared to an untreated fabric (=100%). The closer the measurement (measured on an Elrepho spectrophotometer) is to 100%, the whiter is the test fabric analyzed and the more efficient is the polyester.

TABLE 3

| Testex PES 730 polyester fabric | Formulation "O" | Polyester 1 | Polyester 2 | Polyester 3 | Polyester 5C |
|---|---|---|---|---|---|
| 69.5 | 69.4 | 84.9 | 85.1 | 81.1 | 78.4 |

Formulation (O):
Constituents in percent by weight:

| | | |
|---|---|---|
| A | potash-coconut soap (27%) | 3% |
| B | 1,2-propanediol | 5% |
| C | Genapol LA-070 (Clariant) lauryl alcohol ethoxylate, 7EO | 4% |
| D | alkylbenzenesulfonate (Marlon A350/50%) | 17% |
| E | sodium cumenesulfonate | 0.5% |
| F | citric acid (30% solution) | 0.6% |
| G | water | ad 100 |
| pH: | | 7.5-7.6 |

The invention claimed is:

1. An aqueous polyester concentrate having a proportion by weight of polyester of 12 to 60%, wherein the polyester is prepared by polymerizing the components selected from the group consisting of
   a) at least one sulfo-free aromatic dicarboxylic acid, salt thereof, anhydride thereof, and/or ester thereof,
   b) optionally at least one sulfo-containing dicarboxylic acid, salt thereof, anhydride thereof, and/or ester thereof,
   c) 1,2-propylene glycol,
   d) ethylene glycol,
   e) at least one compound of the formula (1)

$$R^1O(CHR^2CHR^3O)_nH \quad (1)$$

wherein
   $R^1$ is a linear or branched, saturated or unsaturated alkyl group having 1 to 22 carbon atoms,
   $R^2$ and $R^3$ are each independently hydrogen or an alkyl group having 1 to 4 carbon atoms, and
   n is a number from 1 to 50,
   f) optionally at least one compound of the formula (2)

$$H—(OCH_2CH_2)_m—SO_3X \quad (2)$$

wherein
   m is a number from 1 to 10 and
   X is hydrogen or an alkali metal ion,
   and
   g) optionally at least one crosslinking polyfunctional compound, with the proviso that the molar ratio of components c) 1,2-propylene glycol to d) ethylene glycol is greater than or equal to 1.70.

2. An aqueous polyester concentrate as claimed in claim 1, wherein the molar ratio of 1,2-propylene glycol:ethylene glycol is from 1.70 to 20.0.

3. An aqueous polyester concentrate as claimed in claim 1, wherein the proportion by weight of polyester is 20 to 60%.

4. An aqueous polyester concentrate as claimed in claim 1, wherein the polyesters are obtainable by polymerizing components a) to g) in the following molar ratios, based on 1 mol of component a):
   0 to 4 mol of component b),
   0.1 to 4 mol of the sum of components c)+d),
   0.1 to 4 mol of component e),
   0 to 4 mol of component f), and
   0 to 0.2 mol of component g).

5. An aqueous polyester concentrate as claimed in claim 1, wherein the polyester is prepared by polymerizing components a) to g) in the following molar ratios, based on 1 mol of component a):
   0.1 to 2 mol of component b),
   0.5 to 4 mol of the sum of components c)+d),
   0.1 to 4 mol of component e),
   0 mol of component f), and
   0 mol of component g).

6. An aqueous polyester concentrate as claimed in claim 1, wherein component a) is a compound selected from the group consisting of terephthalic acid, C1-C4-alkyl esters of terephthalic acid, isophthalic acid and C1-C4-alkyl esters of isophthalic acid.

7. An aqueous polyester concentrate as claimed in claim 1, wherein component b) is a compound selected from the group consisting of 5-sulfoisophthalic acid, alkali metal salts of 5-sulfoisophthalic acid, di($C_1$-$C_4$)alkyl 5-sulfoisophthalates, and di($C_1$-$C_4$-alkyl) 5-sulfoisophthalate alkali metal salts.

8. An aqueous polyester concentrate as claimed in claim 1, wherein component e) is a polyethylene glycol monomethyl ether of the formula (1a)

$$CH_3—O—(C_2H_4O)_n—H \quad (1a)$$

where n=2 to 10.

9. A soil release polymer comprising an aqueous polyester concentrate having a proportion by weight of polyester of 12 to 60%, the polyester prepared by polymerizing the components
   a) at least one sulfo-free aromatic dicarboxylic acid, salt thereof, anhydride thereof, and/or ester thereof,
   b) optionally at least one sulfo-containing dicarboxylic acid, salts thereof, anhydride thereof, and/or ester thereof, c) 1,2-propylene glycol,
d) ethylene glycol,
e) at least one compound of the formula (1)

$$R^1O(CHR^2CHR^3O)_nH \qquad (1)$$

wherein
  $R^1$ is a linear or branched, saturated or unsaturated alkyl group having 1 to 22 carbon atoms,
  $R^2$ and $R^3$ are each independently hydrogen or an alkyl group having 1 to 4 carbon atoms, and
  n is a number from 1 to 50,
f) optionally at least one compound of the formula (2)

$$H-(OCH_2CH_2)_m-SO_3X \qquad (2)$$

wherein
  m is a number from 1 to 10 and
  X is hydrogen or an alkali metal ion,
and
g) optionally at least one crosslinking polyfunctional compound,
with the proviso that at least one of components b) or f) is present, and with the further proviso that the molar ratio of components c) 1,2-propylene glycol to d) ethylene glycol is greater than or equal to 1.70.

10. A dispersant comprising an aqueous polyester concentrate having a proportion by weight of polyester of 12 to 60%, the polyester prepared by polymerizing the components selected from the group consisting of a) at least one sulfo-free aromatic dicarboxylic acid, salt thereof, anhydride thereof, and/or ester thereof,
b) optionally at least one sulfo-containing dicarboxylic acid, salts thereof, anhydride thereof, and/or ester thereof,
c) 1,2-propylene glycol,
d) ethylene glycol,
e) at least one compound of the formula (1)

$$R^1O(CHR^2CHR^3O)_nH \qquad (1)$$

wherein
  $R^1$ is a linear or branched, saturated or unsaturated alkyl group having 1 to 22 carbon atoms,
  $R^2$ and $R^3$ are each independently hydrogen or an alkyl group having 1 to 4 carbon atoms, and
  n is a number from 1 to 50,
f) optionally at least one compound of the formula (2)

$$H-(OCH_2CH_2)_m-SO_3X \qquad (2)$$

wherein
  m is a number from 1 to 10 and
  X is hydrogen or an alkali metal ion,
and
g) optionally at least one crosslinking polyfunctional compound,
with the proviso that that the molar ratio of components c) 1,2-propylene glycol to d) ethylene glycol is greater than or equal to 1.70.

* * * * *